United States Patent
Matsumura et al.

(10) Patent No.: US 7,854,871 B2
(45) Date of Patent: Dec. 21, 2010

(54) METHOD FOR PRODUCING POLYOLEFIN-BASED RESIN CROSSLINKED FOAMED SHEET AND POLYOLEFIN-BASED RESIN CROSSLINKED FOAMED SHEET

(75) Inventors: Michio Matsumura, Hasuda (JP);
Patrick Geraedts, Hammermolen (NL);
Patrick Roegies, Andreashof (NL)

(73) Assignee: Sekisui Chemical Co., Ltd., Osaka (JP)

( * ) Notice: Subject to any disclaimer, the term of this patent is extended or adjusted under 35 U.S.C. 154(b) by 348 days.

(21) Appl. No.: 11/665,496

(22) PCT Filed: Oct. 18, 2005

(86) PCT No.: PCT/JP2005/019147

§ 371 (c)(1),
(2), (4) Date: Apr. 16, 2007

(87) PCT Pub. No.: WO2006/043570

PCT Pub. Date: Apr. 27, 2006

(65) Prior Publication Data

US 2008/0003421 A1 Jan. 3, 2008

(30) Foreign Application Priority Data

Oct. 18, 2004 (EP) ................... 04024792
Oct. 20, 2004 (JP) ................... 2004-305203

(51) Int. Cl.
*B29C 44/20* (2006.01)
(52) U.S. Cl. .......................................... 264/175; 264/48
(58) Field of Classification Search .................. 264/48, 264/46.3, 175, 209.5, DIG. 14
See application file for complete search history.

(56) References Cited

U.S. PATENT DOCUMENTS 4,666,768 A * 5/1987 Tschudin-Mahrer ..... 428/318.6

FOREIGN PATENT DOCUMENTS

| JP | 54-063172 | 5/1979 |
| JP | 57-191027 | 11/1982 |
| JP | 59-062118 | 4/1984 |
| JP | 62-189144 | 8/1987 |
| JP | 11-348064 | 12/1999 |
| JP | 2001-040128 | 2/2001 |

* cited by examiner

*Primary Examiner*—Christina Johnson
*Assistant Examiner*—Galen Hauth
(74) *Attorney, Agent, or Firm*—Wenderoth, Lind & Ponack, L.L.P.

(57) ABSTRACT

The present invention provides a method for producing a polyolefin-based resin crosslinked foamed sheet which is excellent in heat resistance and flexibility, has a small diameter of cells, can be developed in various utilities, and is excellent in vacuum moldability. The method for producing a polyolefin-based resin crosslinked foamed sheet according to the present invention comprises the steps of supplying a foamed sheet with closed cells, comprising a polyolefin-based resin, to a gap between one pair of rolls which have different circumferential speeds, and are rotated so that rotation directions on facing surfaces are the same direction, and applying a compression force and a shear stress to the foamed sheet with closed cells simultaneously to rupture a part of closed cells of the foamed sheet with closed cells to communicate closed cells into open cells.

8 Claims, 2 Drawing Sheets

METHOD FOR PRODUCING POLYOLEFIN-BASED RESIN CROSSLINKED FOAMED SHEET AND POLYOLEFIN-BASED RESIN CROSSLINKED FOAMED SHEET

This application is a U.S. national stage of International Application No. PCT/JP2005/019147 filed Oct. 18, 2005.

TECHNICAL FIELD

The present invention relates to a method for producing a polyolefin-based resin crosslinked foamed sheet and a polyolefin-based resin crosslinked foamed sheet.

BACKGROUND ART

Previously, as a sealing material of a wall material of buildings, a gasket of a lamp cover of automobiles, or a cushioning material of an automobile door material, a polyurethane foamed sheet has been used, but there is a problem that a polyurethane foamed sheet is degraded with a moisture in the air, or is deteriorated with ultraviolet-ray.

Then, Patent Document 1 proposes a method for producing a crosslinked polyolefin open cell body, comprising a step of molding a foamable crosslinking composition obtained by adding a foaming agent and organic peroxide to a polyolefin-based resin, into a desired shape at a prescribed temperature in the state of a gel fraction of zero, a step of heating this molded foamable crosslinking composition under a normal pressure to perform degradation of organic peroxide and a foaming agent simultaneously, to form a foam, and a step of applying mechanical deformation to this foam to communicate cells.

However, since the aforementioned method for producing a crosslinked polyolefin open cell body requires a complex crosslinking/foaming step; thus, there arises a problem of poor production efficiency. Further, the obtained crosslinked polyolefin open cell body has a problem that a non-foamed layer formed on a surface thereof is hard; therefore, a flexibility lacks.

Patent Document 1: JP-B-62-19294

DISCLOSURE OF THE INVENTION

Problems to be Solved by the Invention

The present invention provides a polyolefin-based resin crosslinked foamed sheet which is excellent in heat resistance and flexibility, has a small diameter of cells, can be developed in various utilities, and is excellent in vacuum moldability.

Means for Solving the Problems

The method for producing a polyolefin-based resin crosslinked foamed sheet according to the present invention comprises the steps of supplying a foamed sheet with closed cells, comprising a polyolefin-based resin, to a gap between one pair of rolls which have different circumferential speeds, and are rotated so that rotation directions on facing surfaces are the same direction, and applying a compression force and a shear stress to the foamed sheet with closed cells to rupture a part of closed cells of the foamed sheet with closed cells to communicate closed cells into open cells.

Also, the method for producing a polyolefin-based resin crosslinked foamed sheet according to the present invention comprises the steps of using, as one set of a roll pair, one pair of rolls which have different circumferential speeds, and are rotated so that rotating directions on facing surfaces are the same direction, supplying sequentially a foamed sheet with closed cells, comprising a polyolefin-based resin, to a gap between rolls of each roll of a roll group in which two or more sets of the roll pairs are sequentially disposed, and applying a compression force and a shear stress to the foamed sheet with closed cells simultaneously to rupture a part of closed cells of the foamed sheet with closed cells to communicate closed cells into open cells, wherein rolls having a greater circumferential speed of respective roll pairs are disposed on opposite sides, putting the foamed sheet with closed cells therebetween, in arbitrary two sets of roll pairs adjacent to each other among the roll group.

At first, explanation will be given of a foamed sheet with closed cells, which is used in the method for producing a polyolefin-based resin crosslinked foamed sheet and comprises a polyolefin-based resin. This foamed sheet with closed cells is not particularly limited, but examples include a foamed sheet with closed cells having a crosslinked structure obtained by electron beam crosslinking, a foamed sheet with closed cells having a crosslinked structure obtained by chemical crosslinking, and the like. The foamed sheet with closed cell having a crosslinked structure obtained by electron beam crosslinking is preferable because it has a small diameter of cells and can be developed in various utilities.

At the outset, a foamed sheet with closed cells having a crosslinked structure obtained by electron beam crosslinking will be explained. First, a polyolefin-based resin and a pyrolysis-type foaming agent are supplied to an extruder, melted and kneaded, and a foamable polyolefin-based resin sheet is extruded through an extruder.

Examples of the polyolefin-based resin include a polyethylene-based resin; a polypropylene-based resin; an olefin copolymer such as an ethylene-vinyl acetate copolymer (EVA), an ethylene-methyl acrylate copolymer (EMA), and an ethylene-butyl acrylate copolymer (EBA), EPDM, and a polyethylene/polypropylene rubber. A polyolefin-based resin having, as a main component, a polyethylene-based resin, a polypropylene-based resin, or a mixture of a polyethylene-based resin and a polypropylene-based resin is preferable. A main component means that one of a polyethylene-based resin and a polypropylene-based resin, or both of them are contained in a polyolefin-based resin at a total amount 50% by weight or more.

And, a polyethylene-based resin is not particularly limited, but examples include very low density polyethylene (VLDPE), low density polyethylene (LDPE), medium density polyethylene, high density polyethylene (HDPE), linear low density polyethylene (LLDPE), linear medium density polyethylene, and linear high density polyethylene, and these may be used alone, or may be used together.

In addition, a polypropylene-based resin is not particularly limited, but examples include a propylene homopolymer, and a copolymer of propylene and other olefin, and these may be used alone, or two or more kinds of them may be used together. In addition, a copolymer of propylene and other olefin may be any of a block copolymer, a random copolymer, and a random block copolymer.

In addition, examples of olefin to be copolymerized with propylene include α-olefin such as ethylene, 1-butene, 1-pentene, 4-methyl-1-pentene, 1-hexene, 1-octene, 1-nonene, and 1-decene.

In addition, the pyrolysis-type foaming agent is not particularly limited as far as it has previously been used in production of a foam, but examples include azodicarbonamide, benzenesulfonylhydrazide, dinitrosopentamethylenetetramine, toluenesulfonylhydrazide, and 4,4-oxybis(benzenesulfonylhydrazide). These may be used alone, or two or more kinds may be used together.

Then, the foamable polyolefin-based resin sheet is irradiated with an electron beam to impart a crosslinked structure to the foamable polyolefin-based resin sheet. Like this, when electron irradiation is used as a means for imparting a crosslinked structure to the foamable polyolefin-based resin sheet, a foamed sheet obtained by foaming the foamable polyolefin-based resin sheet has fine closed cells and, at the same time, excellent surface smoothness.

When an irradiation dose of an electron beam to the foamable polyolefin-based resin sheet is small, a necessary crosslinked structure can not be imparted to the foamable polyolefin-based resin sheet in some cases. On the other hand, when the dose is large, crosslinking is applied too much to the foamable polyolefin-based resin sheet, and foamability of the foamable polyolefin-based resin sheet is conversely reduced in some cases. Therefore, the dose is preferably 0.1 to 30 Mrad, more preferably 0.2 to 20 Mrad, particularly preferably 0.3 to 15 Mrad.

In addition, an acceleration voltage for electron beam may be appropriately adjusted depending on a thickness of the foamable polyolefin-based resin sheet, further, an electron beam may be irradiated on only on one side or both sides of the foamable polyolefin-based resin sheet. In order to uniformly crosslink the foamable polyolefin-based resin sheet in its thickness direction, it is preferable to irradiate both sides of the foamable polyolefin-based resin sheet with an electron beam at the same acceleration voltage and the same irradiation dose.

And, in order to promote crosslinking of the foamable polyolefin-based resin sheet by this irradiation of an electron beam, a crosslinking assistant may be added to the foamable polyolefin-based resin sheet. Such the crosslinking assistant is not particularly limited as far as it has been previously used for manufacturing a foamed sheet, and examples include divinylbenzene, trimethylolpropane trimethacrylate, 1,9-nonanediol dimethacrylate, 1,10-decanediol dimetacrylate, trimellitic acid triacyl ester, triallyl isocyanurate, ethylvinylbenzene, neopentyl glycol dimethacrylate, 1,2,4-benzenetricarboxylic acid triallyl ester, 1,6-hexanediol dimethacrylate, lauryl methacrylate, stearyl methacrylate, diallyl phthalate, diallyl terephthalate, and diallyl isophthalate, and these may be used alone, or two or more kinds of them may be used together.

When an addition of crosslinking assistant to be added is small, a necessary crosslinked structure can not be imparted to the foamable polyolefin-based resin sheet in some cases. On the other hand, even when the amount is large, the effect of addition of a crosslinking assistant is not greatly altered. Therefore, the amount is preferably 0.1 to 30 parts by weight, more preferably 0.2 to 20 parts by weight, particularly preferably 0.3 to 15 parts by weight relative to 100 parts by weight of a polyolefin-based resin.

The foamable polyolefin-based resin sheet to which a crosslinked structure has been thus imparted is heated to a temperature of a degradation temperature of a pyrolysis-type foaming agent or higher, to foam it, thereby, a foamed sheet with closed cells, having a crosslinked structure obtained by electron beam crosslinking and comprising a polyolefin-based resin, is produced. A skin layer is formed on both sides of a cell layer of this foamed sheet with closed cells. Almost all of cells constituting the cell layer are substantially closed cells and, at the same time, the cell layer has a crosslinked structure obtained by electron beam crosslinking. Further, the skin layer, formed by air-tight adhesion of cell walls of cells of the cell layer and integration thereof into a thin film, has a crosslinked structure obtained by electron beam crosslinking.

Next, a method for producing a foamed sheet with closed cell having a crosslinked structure obtained by chemical crosslinking will be explained. At first, a polyolefin-based resin, a crosslinking agent and a pyrolysis-type foaming agent are supplied to an extruder, melted and kneaded, and a foamable polyolefin-based resin sheet is extruded through an extruder. Herein, the polyolefin-based resin and the pyrolysis-type foaming agent are similar to the polyolefin-based resin and the pyrolysis-type foaming agent which are used in the foamed sheet with closed cells having a crosslinked structure obtained by electron beam crosslinking; therefore, explanation thereof is omitted.

Herein, the crosslinking agent is not particularly limited as far as it has previously been used in production of a foam, but examples include 2,4-dichlorobenzoylperoxide, benzoylperoxide, t-buthyl perbenzoate, cumylhydroperoxide, t-buthylhydroperoxide, 1,1-di(t-buthylperoxy)-3,3,5-trimethylhexane, n-buthyl-4,4-di(t-buthylperoxy)valerate, α,α'-bis(t-buthylperoxyisopropyl)benzene, 2,5-dimethyl-2,5-di(t-buthylperoxy)hexyne-3, and t-buthyl peroxycumene.

And, the foamable polyolefin-based resin sheet is heated to a temperature of degradation temperatures of a crosslinking agent and a pyrolysis-type foaming agent or higher, to foam it while imparting a crosslinked structure thereto, thereby, a foamed sheet with closed cells, having a crosslinked structure obtained by chemical crosslinking and comprising a polyolefin-based resin, is produced. A skin layer is formed on both sides of a cell layer of this foamed sheet with closed cells. Almost all of cells constituting the cell layer are substantially closed cells and, at the same time, the cell layer has a crosslinked structure obtained by chemical crosslinking. Further, the skin layer, formed by air-tight adhesion of cell walls of cells of the cell layer and integration thereof into a thin film, has a crosslinked structure obtained by chemical crosslinking.

In addition, the method for producing a polyolefin-based resin crosslinked foamed sheet according to the present invention has an advantage that a foamed sheet with closed cells, which has a high density, can be treated. A density of the foamed sheet with closed cells is preferably 20 to 500 kg/m$^3$, more preferably 24 to 350 kg/m$^3$, particularly preferably 29 to 250 kg/m$^3$.

Further, an expansion ratio of the foamed sheet with closed cells is not particularly limited, but 2 to 50 times is preferable, 2 to 40 times is more preferable, and 5 to 30 times is particularly preferable. An expansion ratio of the foamed sheet with closed cells refers to a ratio obtained by dividing a density of a polyolefin-based resin constituting the foamed sheet with closed cells by an apparent density of the foamed sheet with closed cells. An apparent density of the foamed sheet with closed cells refers to an apparent density measured according to JIS K 6767. For example, an apparent density can be measured by using an electronic gravimeter which is commercially available under a trade name "ED20T" from Mirage.

And, a thickness of the foamed sheet with closed cells is not particularly limited as far as the sheet can pass between rolls of a roll pair described later, and, usually, 0.2 to 50 mm is preferable. The reason is as follows: when a thickness of the foamed sheet with closed cells is small, it is necessary to improve precision of a device such as a distance and a parallel degree between rolls of a roll pair, and it is difficult to improve this precision of a device and, on the other hand, when a thickness of the foamed sheet with closed cells is large, a compression force and a shear stress which can sufficiently rupture closed cells of a cell layer of the foamed sheet with closed cells cannot be sufficiently applied to the foamed sheet with closed cells in some cases. In the present invention, a thickness of a foamed sheet refers to a thickness measured according to ISO 1923.

In the foamed sheet with closed cells, all of cells constituting the cell layer are substantially closed cells. However, all of cells constituting the cell layer are not necessary to be closed cells. As far as the cell layer has closed cells, open cells may be present in the cell layer. In addition, before the foamed sheet, in which all of cells constituting the cell layer are substantially closed cells, is supplied to the gap between the rolls of the roll pair to be described later, the foamed sheet, in which all of cells constituting the cell layer are substantially closed cells, is subjected to some treatment, to thereby communicate a part of closed cells with each other to obtain open cells.

Then, in order to rupture a part of closed cells in a cell layer of the foamed sheet with closed cells to communicate with each other to obtain open cells, a pair of rolls is used as a set of a roll pair, and the foamed sheet with closed cells is sequentially supplied to a gap between rolls of each roll pair of a roll group in which one or two or more sets of the above roll pair are disposed. Alternatively, the foamed sheet with closed cells may be repeatedly supplied to a gap between rolls of the same roll pair.

Further, when the number of roll pairs is small, closed cells of a closed cell foam are insufficiently converted into open cells in some cases and, on the other hand, when the number is large, a crack is generated on a surface of a closed cell foam, and surface property is deteriorated in some cases and, therefore, two sets is preferable.

And, rolls of each roll pair are rotated at different circumferential speeds so that rotating directions of facing surfaces are the same and, at the same time, it is adjusted so that a gap between facing surfaces is narrower than a thickness of a foamed sheet with closed cells. In addition, rolls of one pair are disposed so that axial cores of them are parallel.

As a difference in circumferential speeds between rolls of one pair grows greater in a roll pair, or as a gap between rolls of a roll pair grows narrower, a ratio of closed cells communicating to be open cells is increased. In addition, as a difference in circumferential speeds between rolls of one pair grows greater, a frictional force and a shear stress applied to a foamed sheet with closed cells grow greater, but a ratio of closed cells, communicating to be open cells, of a foamed sheet with closed cells does not grow greater proportionally.

Further, when a plurality of sets of roll pairs are used, it is preferable that, between arbitrary two sets of roll pairs adjacent to each other, rolls having a greater circumferential speed among respective roll pairs are disposed on opposite sides, putting a foamed sheet with closed cells therebetween. By disposing rolls like this, a compression force and a shear stress can be totally applied to a foamed sheet with closed cells generally uniformly and, therefore, the resulting polyolefin-based resin crosslinked foamed sheet can be formed in the state where open cells are totally disposed in the sheet uniformly.

And, when a circumferential speed difference between rolls in a roll pair is small, closed cells of a foamed sheet with closed cells are insufficiently communicated to be open cells in some cases in the case where an apparent density of a foamed sheet with closed cells is 28 kg/m$^3$ or more, or in the case where a foamed sheet with closed cells has a great width. On the other hand, when the circumferential speed difference is great, a great frictional force is applied to a surface of a foamed sheet with closed cells, and a foamed sheet with closed cells is damaged. Therefore, the circumferential speed difference is preferably 2 to 400%, more preferably 5 to 250%, further preferably 5 to 50%, particularly preferably 10 to 40%, most preferably 10 to 30%.

Herein, a circumferential speed difference between rolls in a roll pair can be calculated based on the following equation, letting a circumferential speed of a roll having a greater circumferential speed among a roll pair to be VF, and letting a circumferential speed of a roll having a smaller circumferential speed to be VS. In the present invention, a circumferential speed of a roll means a so-called "speed" regardless of its rotation direction.

$$\text{Circumferential speed difference of rolls of one pair} = 100 \times (VF - VS)/VS$$

In addition, when a plurality of sets of roll pairs are used as shown in FIG. 3, it is preferable to adjust between arbitrary two sets of roll pairs adjacent to each other among a roll group, so as to be circumferential speed V2>circumferential speed V1, circumferential speed V4>circumferential speed V3, and circumferential speed V3>circumferential speed V1. As a preferable aspect, it is preferable to adjust so as to be circumferential speed V4>circumferential speed V2>circumferential speed V3>circumferential speed V1.

A circumferential speed V1 is a circumferential speed of a roll R1 of a roll pair on a rear side, a circumferential speed V2 is a circumferential speed of a roll R2 of a roll pair on a rear side, a circumferential speed V3 is a circumferential speed V3 of a roll R3 of a roll pair on a front side, and a circumferential speed V4 is a circumferential speed V4 of a roll R4 of a roll pair on a front side. A roll R1 and a roll R4 are situated on the same side of a foamed sheet with closed cells, and a roll R2 and a roll R3 are situated on the same side of a foamed sheet with closed cells. In addition, a direction of supply of a foamed sheet with closed cells to a roll pair is front, and a direction opposite by 180° relative to front is rear.

And, a total speed of a roll pair can vary in a wide range, and is preferably 1 to 50 m/min, more preferably 5 to 40 m/min, particularly preferably 10 to 30 m/min, most preferably 10 to 20 m/min. When plurality sets of roll pairs are used, it is preferable that a total speed of a roll pair on a front side is greater than a total speed of a roll pair on a rear side, between arbitrary two sets of roll pairs adjacent to each other. A total speed of a roll pair refers to a discharge speed of a foamed sheet with closed cells, which is discharged from a gap between one pair of rolls.

In addition, an absolute circumferential speed of a roll in a roll pair can vary in a wide range, and is preferably 0.5 to 30 m/min, more preferably 2.5 to 20 m/min, particularly preferably 5 to 15 m/min, most preferably 5 to 10 m/min. An absolute circumferential speed of a roll in a roll pair refers to a circumferential speed of each roll constituting a roll pair.

In addition, a gap between facing surfaces of a roll in a roll pair is appropriately adjusted depending on an expansion rate and a thickness of a foamed sheet with closed cells, and is preferably 1 to 50%, more preferably 2 to 20% of a thickness of a foamed sheet with closed cells before passage between rolls of a roll pair. The reason is as follows: when a gap between facing surfaces of a roll of a roll pair is narrow, a foamed sheet with closed cells is excessively broken, and a thickness becomes too small, or a surface of a foamed sheet may be broken and, on the other hand, when a gap between facing surfaces of a roll of a roll pair is wide, a shear stress cannot be sufficiently applied to a foamed sheet with closed cells, and a ratio of closed cells, communicating to be open cells, of a foamed sheet with closed cells is lowered in some cases.

Specifically, a gap between facing surfaces of a roll in a roll pair is preferably 0.01 to 50 mm, more preferably 0.05 to 50 mm, particularly preferably 0.1 to 5 mm, most preferably 0.1 to 1 mm. A diameter of the roll is preferably 100 to 1000 mm.

In addition, when a plurality of sets of roll pairs are used, gaps between facing surfaces of rolls of respective roll pairs may be different. For example, when two sets of roll pairs are used, a gap between rolls of a roll pair to which a foamed sheet with closed cells is initially supplied may be wider than a gap between rolls of a next (front) roll pair.

Further, in a step of passing a foamed sheet with closed cells between rolls of a roll pair, gap constancy between rolls of a roll pair is preferably 0.03 mm (±0.01 mm). In the state where a stress is applied to a closed foamed sheet, that is, in the sate where a foamed sheet with closed cells is supplied between rolls of a roll pair to compress a foamed sheet with closed cells in a thickness direction, roll straightness accuracy in a width direction is preferably 0.01 mm or less.

Further, when at least two sets of roll pairs are used, by applying a tensile force to a foamed sheet with closed cells between adjacent roll pairs preferably in a direction of supplying a foamed sheet with closed cells to a roll pair, the effect of rupturing closed cells of a foamed sheet with closed cells can be improved, and a degree of open cells can be increased. In addition, before a foamed sheet with closed cells is supplied between rolls of an initial roll pair, a tensile force may be applied to a foamed sheet with closed cells preferably in a direction of supplying a foamed sheet with closed cells to a roll pair.

A foamed sheet with closed cells is supplied between the thus adjusted rolls of a roll pair, to compress a foamed sheet with closed cells in its thickness direction. Moreover, since a circumferential speed is different between rolls in a roll pair, a foamed sheet with closed cells is discharged from between rolls at different speeds at one side part and another side part. Due to this difference in a discharge speed, the aforementioned compression in a thickness direction is applied to a foamed sheet with closed cells and, at the same time, a shear stress is applied to a foamed sheet with closed cells in its planar direction, so that a part of closed cells of a foamed sheet with closed cells are ruptured to break cell walls, thereby, closed cells are communicated with each other to form open cells.

As described above, not only by applying a compression force to a foamed sheet with closed cells in its thickness direction, but also applying a shear stress in a planar direction of a foamed sheet with closed cells at the same time with this compression, a part of closed cells of a foamed sheet with closed cells can be stably broken to communicate them, thereby, open cells can be formed.

When an open cell ratio of the polyolefin-based resin crosslinked foamed sheet obtained by breaking a part of closed cells and communicating the closed cells with each other to form open cells in the aforementioned manner is low, the flexibility of the polyolefin-based resin crosslinked foamed sheet is decreased in some cases. On the other hand, when the open cell ratio is high, a compressive strength and a repulsion force at compression of the polyolefin-based resin crosslinked foamed sheet is decreased in some cases. Therefore, the open cell ratio is preferably 30 to 99%, more preferably 80 to 95%.

In the present invention, the open cell ratio of the foamed sheet means a volume ratio of communicated cells relative to a volume of the foamed sheet, and refers to a value obtained by measuring a closed cell ratio by 1 to ½ to 1 barometric method using an air densimeter and calculating on the basis of the following expression. Specifically, the open cell ratio of the foamed sheet can be measured using an air densimeter commercially available under a trade name "model 1000" from Tokyo Science Co., Ltd.

Open cell ratio of foamed sheet(%)=100−closed cell ratio(%)

A pressure applied to a foamed sheet with closed cells passing between rolls of each roll pair is controlled by adjusting a tensile force, a frictional force, or a tensile force of a roll in a circumferential direction, which are applied to a foamed sheet with closed cells, depending on properties required for a polyolefin-based resin crosslinked foamed sheet, and properties of a polyolefin-based resin crosslinked foamed sheet.

And, a compression degree of a foamed sheet with closed cells and a communicating degree of closed cells (rupture degree of cells) are adjusted by parameters such as a gap between rolls of a roll pair, a circumferential speed of a roll, a circumferential speed difference between rolls in a roll pair, and a total speed of a roll pair.

Further, the aforementioned parameters are adjusted in order to impart a desired change to properties of a foamed sheet with closed cells while no influence is optically given to the resulting polyolefin-based resin crosslinked foamed sheet, that is, while breakage or damage is not caused on a surface of the resulting polyolefin-based resin crosslinked foamed sheet.

On the other hand, a chemical nature of a polyolefin-based resin constituting a foamed sheet with closed cells, and a chemical nature of a cell weakening additive to be added to a foamed sheet with closed cells also influence on conversion of closed cells of a foamed sheet with closed cells into open cells.

However, in the method for producing the polyolefin-based resin crosslinked foamed sheet of the present invention, only a smaller amount of the aforementioned additive is necessary, and the same degree of open cells can be obtained as that of open cells obtained by using a cell weakening additive.

In addition, when a plurality sets of roll pairs are used, in addition to further means, a stabilizing roll, and a roll supporting a foamed sheet with closed cells so that a foamed sheet with closed cells progresses in a correct direction, may be disposed between adjacent roll pairs.

And, a variation in friction applied to a foamed sheet with closed cells may be controlled by disposing dancer system, or a similar device between adjacent roll pair.

In addition, according to the method for producing the polyolefin-based resin crosslinked foamed sheet of the present invention, the method can be applied to a wide range of foamed sheets with closed cells. A width of a foamed sheet with closed cells is preferably 1 m or more, more preferably 1.5 m or more, further preferably 2.0 m or more, most preferably about 2.0 m. A width of a foamed sheet with closed cells is preferably 1.0 to 2.0 m. It goes without saying that a width of a foamed sheet with closed cells may be less than 2.0 m.

Particularly, in automobile industry, a polyolefin-based resin crosslinked foamed sheet having high flexibility and a great width is required increasingly, and this sheet has not been obtained in the prior art. However, by using one set or a plurality of sets of roll pairs, supplying a foamed sheet with closed cells between rolls of this roll pair, and applying a compression stress and a shear stress to a foamed sheet with closed cells, a polyolefin-based resin crosslinked foamed sheet satisfying the aforementioned requirement can be obtained.

And, the effect in a step of supplying a foamed sheet with closed cells between rolls of a roll pair, and breaking cell walls of a foamed sheet with closed cells to rupture cells in the method for producing the polyolefin-based resin crosslinked foamed sheet is more remarkable as an expansion ratio of a foamed sheet with closed cells is higher. However, according to the method for producing the polyolefin-based resin foamed crosslinked foamed sheet of the present invention, the method can be applied to even a foamed sheet with closed cells having a low expansion ratio, and closed cells of a foamed sheet with closed cells can be sufficiently ruptured to obtain a polyolefin-based resin crosslinked foamed sheet having open cells.

And, in the resulting polyolefin-based resin crosslinked foamed sheet, open cells are formed over a full length of its thickness direction and, on the other hand, skin layers on both sides of the polyolefin-based resin crosslinked foamed sheet have no crack or damage, and have water resistance, even after application of the aforementioned compression force and shear stress.

The polyolefin-based resin crosslinked foamed sheet has excellent compressive strength and repulsion force at compression due to closed cells, and flexibility due to open cells, while the sheet has no permeability to the air and water due to a skin layer.

Therefore, the polyolefin-based resin crosslinked foamed sheet can be suitably used in comfort materials, buffering materials, and interior materials in automobiles excellent in touching. Further, the polyolefin-based resin crosslinked foamed sheet can be also suitably used in special utility such as medical buffering materials such as bandage and dressing for wound.

In addition, when one wishes to impart gas permeability to the polyolefin-based resin crosslinked foamed sheet, a pore may be perforated on a surface of the polyolefin-based resin crosslinked foamed sheet using a needle or a laser.

Among polyolefin-based resin crosslinked foamed sheets produced by the method for producing a polyolefin-based resin crosslinked foamed sheet, a polyolefin-based resin crosslinked foamed sheet produced by using a foamed sheet with closed cells, having a crosslinked structure obtained by electron beam crosslinking and comprising a polyolefin-based resin, is particularly preferable because it has excellent compressive strength and repulsion force at compression due to closed cells and flexibility due to open cells.

Further, among polyolefin-based resin crosslinked foamed sheets produced using a foamed sheet with closed cells, having a crosslinked structure obtained by electron beam crosslinking, preferable is a polyolefin-based resin crosslinked foamed sheet comprising: a cell layer having a crosslinked structure obtained by electron beam crosslinking, and including closed cells having an average cell diameter of 0.1 to 1 mm and open cells obtained by communicating a part of the closed cells with each other; and skin layers or a skin layer formed on both sides or one side of this cell layer, formed by air-tight adhesion of cell walls of cells of the cell layer and integration thereof into a thin film, and having a crosslinked structure obtained by electron beam crosslinking.

That is, the polyolefin-based resin crosslinked foamed sheet has a crosslinked structure obtained by electron beam irradiation in which a skin layer is formed on both sides or one side of a cell layer, and cells constituting the cell layer consist of closed cells having an average cell diameter of 0.1 to 1 mm, and open cells in which a part of the closed cells are communicated with each other.

In addition, a cell layer of the polyolefin-based resin crosslinked foamed sheet consists of closed cells, and open cells in which a part of the closed cells are ruptured, and communicated with each other. And, since the polyolefin-based resin crosslinked foamed sheet has a crosslinked structure obtained by electron beam irradiation in the cell layer and a skin layer, the closed cells constituting the cell layer are formed fine unlike a crosslinked structure obtained by chemical crosslinking using organic peroxide. Specifically, an average cell diameter of closed cells of the polyolefin-based resin crosslinked foamed sheet is preferably 0.1 to 1 mm, more preferably 0.1 to 0.5 mm.

And, in the case where open cells constituting the cell layer of the polyolefin-based resin crosslinked foamed sheet is formed by communicating fine closed cells having an average cell diameter of 0.1 to 1 mm with each other, open cells are formed in the fine state like closed cells, and they are not partially biased in the foamed layer, but are in the state where they are generally uniformly dispersed like a network throughout the cell layer of the foamed sheet.

Therefore, the polyolefin-based resin crosslinked foamed sheet is excellent in a compressive strength, and a repulsion force (recovering force) at compression because of fine closed cells constituting a cell layer thereof and, at the same time, retains excellent flexibility because of open cells and, when used in sealing utility such as a sealing material and a gasket, the sheet is smoothly deformed into a form along with a gap shape of a sealing part, and exerts excellent sealing property.

Herein, an average cell diameter of closed cells of the polyolefin-based resin crosslinked foamed sheet refers to a diameter measured by the following procedure. First, the polyolefin-based resin crosslinked foamed sheet is cut in a thickness direction at an arbitral place.

Thereafter, a cut surface of the polyolefin-based resin crosslinked foamed sheet is magnified at an arbitral magnification using a scanning electron microscope (SEM), and a photograph is taken so that a full length in a thickness direction of the polyolefin-based resin crosslinked foamed sheet is taken.

Arbitrary ten closed cells of a cell layer of the polyolefin-based resin crosslinked foamed sheet appearing on the resulting photograph are extracted, and a smallest true circle which can surround the closed cells is drawn. And, by adopting a diameter of a true circle as a cell diameter of a closed cell, a cell diameter of each closed cell is measured, and an arithmetic average of cell diameters of ten closed cells is adopted as an average cell diameter of a closed cell.

In addition, when closed cells and open cells are discriminated in a cell layer, and when an average cell diameter of a closed cell is measured, this is determined based on only a cell section appearing on a photograph. That is, although cells appear to be completely separated with a cell wall in a cut surface of the polyolefin-based resin crosslinked foamed sheet, cells are communicated with each other at a portion other than a cut surface of the polyolefin-based resin crosslinked foamed sheet in some cases. However, in the present invention, without considering whether cells are communicated each other at a portion other than a cut surface of the polyolefin-based resin crosslinked foamed sheet or not, based on only a cell wall section appearing on a photograph, whether it is a closed cell or an open cell is determined and, at the same time, a cell diameter of a closed cell is measured.

In addition, a skin layer is formed on both sides or one side of an overall cell layer of the polyolefin-based resin crosslinked foamed sheet. This skin layer is formed in a thin film manner by tightly adhering and integrating cell walls of cells of a cell layer, and a crosslinked structure of this skin layer is also obtained by electron beam irradiation, and is excellent in surface smoothness. And, a pore is not substantially formed in the skin layer, and the skin layer has no permeability to a liquid such as water, and a gas such as the air.

And, in the polyolefin-based resin crosslinked foamed sheet, a part of cells constituting a cell layer thereof are open cells formed by communicating a part of closed cells with each other, and the sheet has excellent flexibility and, at the same time, is excellent in gas interrupting property and liquid interrupting property in a thickness direction as well as surface smoothness due to a skin layer and, therefore, the sheet has excellent moldability, particularly excellent vacuum moldability, and the sheet can be precisely molded into a desired sheet, and a beautiful molded article excellent in appearance can be obtained.

In addition, when a 50% compressive strength of the polyolefin-based resin crosslinked foamed sheet is small, a repulsion force (recovering force) is reduced upon compression of the polyolefin-based resin crosslinked foamed sheet in its thickness direction, and sufficient air tightness or water tightness is not exerted in some cases in the case where the sheet is used as a sealing material or a gasket. On the other hand, when the 50% compressive strength is great, a repulsion force is great upon compression of the polyolefin-based resin crosslinked foamed sheet in its thickness direction, and the sheet is not precisely disposed on a sealing part in some cases in the case where it is used as a sealing material. Therefore, the 50% compressive strength is preferably 3 to 300 kPa, more preferably 3 to 50 kPa. This 50% compressive strength of the polyolefin-based resin crosslinked foamed sheet can be adjusted by changing a ratio of closed cells and open cells in a cell layer of the polyolefin-based resin crosslinked foamed sheet. Herein, a 50% compressive strength of the polyolefin-based resin crosslinked foamed sheet refers to a 50% compressive strength measured according to JIS K 6767.

Further, when a 50% compression set of the polyolefin-based resin crosslinked foamed sheet is great, durability with time is lacked in the case where the polyolefin-based resin crosslinked foamed sheet is used as a sealing material or a gasket, and air tightness or water tightness is reduced in some cases in the case where the sheet is used over a long period of time, or in the case where a pressure is locally applied to the polyolefin-based resin crosslinked foamed sheet, a part to which a pressure has been applied is recessed, and appearance may be deteriorated, therefore, 10% or smaller is preferable.

In addition, a 50% compression set of the polyolefin-based resin crosslinked foamed sheet refers to a 50% compression set measured by the following procedure. First, by cutting the polyolefin-based resin crosslinked foamed sheet over a full length in a thickness direction, plural of test pieces having a planer square shape having a side of 50 mm are excised from the polyolefin-based resin crosslinked foamed sheet.

And, the plural test pieces are overlaid in their thickness direction to produce a laminated sheet having a thickness of about 25 mm, and an initial thickness $T_0$ of this laminated sheet is measured. Then, this laminated sheet is compressed in a thickness direction until a total thickness becomes 50% of an initial thickness $T_0$, and this is allowed to stand in this compressed state under the atmosphere of 23° C. and a relative humidity of 50% over 22 hours.

Thereafter, a compression force applied to a laminated sheet is completely released, the sheet is allowed to stand over 24 hours, a thickness $T_1$ of a laminated sheet after compression is measured, and a 50% compression set of the polyolefin-based resin crosslinked foamed sheet is calculated based on the following equation.

$$50\% \text{ Compression set}(\%) = 100 \times (T_0 - T_1)/T_0$$

In addition, when an apparent density of the polyolefin-based resin crosslinked foamed sheet is small, a repulsion force is reduced upon compression of the polyolefin-based resin crosslinked foamed sheet in its thickness direction, and sufficient air tightness or water tightness may not be exerted in the case where the sheet is used as a sealing material or a gasket. On the other hand, when the apparent density is great, a repulsion force is great upon compression of the polyolefin-based resin crosslinked foamed sheet in its thickness direction, and the sheet may not be precisely disposed on a sealing part in the case where the sheet is used as a sealing material. Therefore, an apparent density is preferably 20 to 500 kg/m$^3$, more preferably 24 to 350 kg/m$^3$, particularly preferably 29 to 250 kg/m$^3$. An apparent density of the polyolefin-based resin crosslinked foamed sheet is measured according to JIS K 6767.

Further, when a thickness of the polyolefin-based resin crosslinked foamed sheet is small, a repulsion force is small upon compression of the polyolefin-based resin crosslinked foamed sheet in its thickness direction, and sealing property or cushioning property is reduced in some cases. On the other hand, when the thickness is great, the sheet can not be smoothly disposed on a desired place in some cases in the case where the polyolefin-based resin crosslinked foamed sheet is used as a sealing material or a gasket. Therefore, the thickness is preferably 0.1 to 15 mm.

Further, a width of the polyolefin-based resin crosslinked foamed sheet is preferably 1 m or more, more preferably 1.5 m or more, further preferably 2.0 m or more, most preferably about 2.0 m. A width of the polyolefin-based resin crosslinked foamed sheet is preferably 1.0 to 2.0 m. In addition, it goes without saying that a width of the polyolefin-based resin crosslinked foamed sheet may be less than 2.0 m.

EFFECTS OF THE INVENTION

The method for producing a polyolefin-based resin crosslinked foamed sheet according to the present invention comprises the steps of supplying a foamed sheet with closed cells, comprising a polyolefin-based resin, to a gap between one pair of rolls, and applying a compression force and a shear stress to the foamed sheet with closed cells simultaneously; therefore, a part of closed cells of the foamed sheet with closed cells can be securely ruptured to communicate closed cells into open cells.

Since the polyolefin-based resin crosslinked foamed sheet of the present invention is characterized in that it comprises a cell layer having a crosslinked structure obtained by electron beam crosslinking, and having cells consisting of closed cells having an average cell diameter of 0.1 to 1 mm and open cells in which a part of the closed cells are communicated with each other, and skin layers or a skin layer formed on both sides or one side of this cell layer, formed by air-tight adhesion of cell walls of cells of the cell layer and integration thereof into a thin film, and having a crosslinked structure obtained by electron beam crosslinking, the sheet has better balance of excellent compressive strength and repulsion force at compression due to closed cells, and excellent flexibility due to open cells and, further, since the sheet has a skin layer which is excellent in surface property and is not permeable to a liquid and a gas, the sheet is smoothly deformed into a form along with a shape of a sealing part, and exerts excellent sealing property, when used in sealing utility such as a sealing material, and a gasket.

And, since the polyolefin-based resin crosslinked foamed sheet has excellent flexibility, and has a skin layer excellent air interrupting property and surface smoothness as described above, the sheet is excellent in vacuum moldability, and can be smoothly and precisely molded to obtain a beautiful molded article having a desired shape.

Further, since the polyolefin-based resin crosslinked foamed sheet is excellent in smoothness of a skin layer, a surface sheet such as a non-woven fabric can be stably laminated and integrated on a skin layer via an adhesive.

And, a fabric such as a non-woven fabric and a woven fabric, or an embossed film is laminated on the polyolefin-based resin crosslinked foamed sheet, and, thereafter, the polyolefin-based resin crosslinked foamed sheet is molded into a desired shape, thereby, automobile interior materials, and other buffering materials can be obtained.

EXPLANATION OF SYMBOLS

Figure 1:
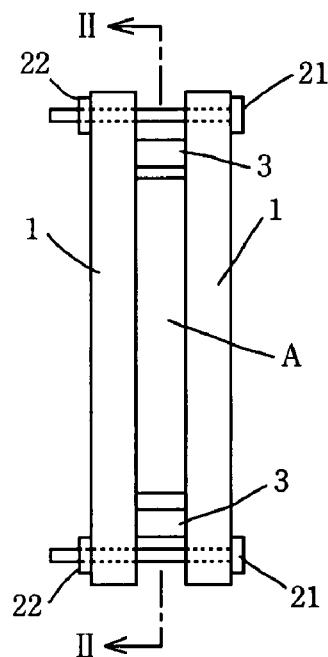
FIG. 1 is a schematic side view showing a procedure of measuring compressive water tightness.
Figure 2:
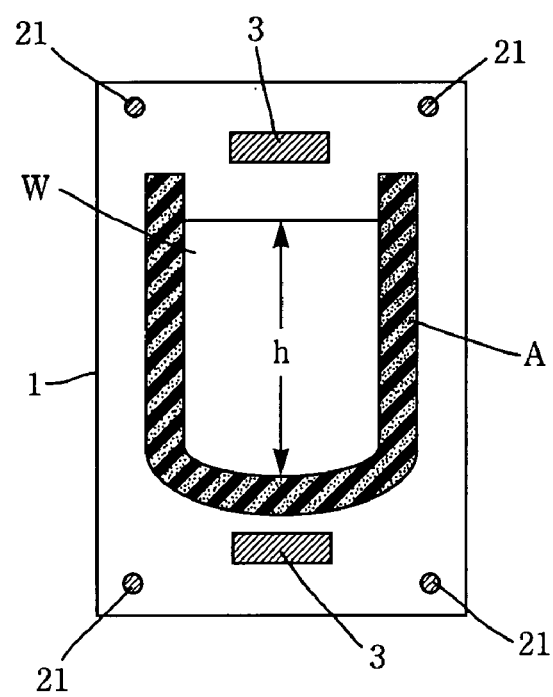
FIG. 2 is a cross-sectional view taken along a line II-II of FIG. 1.

1 Glass plate
A Belt body
W Water
P1, P2 Roll pair
R1 to R4 Roll

BEST MODE FOR CARRYING OUT THE INVENTION

The present invention will be specifically explained below by way of Examples and Comparative Examples. The preset invention is not limited to only the following Examples.

EXAMPLES 1 TO 6

Low density polyethylene (melt flow rate: 4.0 g/10 min, density: 0.923 g/cm$^3$), an ethylene-vinyl acetate copolymer (melt flow rate: 1.3 g/10 min, density: 0.930 g/cm$^3$, vinyl acetate content: 14% by weight), linear low density polyethylene (melt flow rate: 6.0 g/10 min, density: 0.919 g/cm$^3$, α-olefin: 1-hexene), an ethylene-propylene random copolymer (melt flow rate: 2.2 g/10 min, density: 0.92 g/cm$^3$, ethylene content: 3.6% by weight), azodicarbonamide, zinc stearate, calcium stearate, active zinc oxide, a phenol-based antioxidant (manufactured by Ciba Specialty Chemical; trade name "Irganox 1010"), and trimethylolpropane trimethacrylate were supplied to an extruder at prescribed amounts shown in Table 1, and they were melted and kneaded at 135 to 140° C., and extruded into a foamable polyolefin-based resin sheet (simply referred to as "foamable resin sheet" in Table 1) having a thickness shown in Table 1. A width of the foamable polyolefin-based resin sheet was 500 mm. In Example 6, a melting and kneading temperature was 180 to 190° C.

Then, both sides of the foamable polyolefin-based resin sheet was irradiated with an electron beam in a prescribed dose shown in Table 1 at an acceleration voltage of 1000 kV, to impart a crosslinked structure to the foamable polyolefin-based resin sheet, and this foamable polyolefin-based resin sheet was supplied to a vertical foaming machine, and heated to a heating temperature shown in Table 1 to obtain a foamed sheet with closed cells. The foamed sheet with closed cells was constructed of both sides of a foamed layer consisting only of closed cells, and skin layers formed on both sides of this foamed layer in which cell walls of cells of the foamed layer were air tightly adhered and integrated into a thin film. A thickness of the foamed sheet with closed cells, an apparent density of the foamed sheet with closed cells, an expansion ratio of the foamed sheet with closed cells, an average cell diameter of closed cells of a cell layer in the foamed sheet with closed cells (simply referred to as "average cell diameter" in Table 1), and a width of the foamed sheet with closed cells are shown in Table 1. In Table 1, the foamed sheet with closed cells is expressed by "pretreatment foamed sheet".

Subsequently, columnar upper and lower rolls of upper and lower one pair having the same diameter and the same rotation direction on facing surfaces were prepared. A gap on facing surfaces of upper and lower rolls is shown in Table 1. A circumferential speed difference between upper and lower rolls, and circumferential speeds of upper and lower rolls are shown in Table 1. Both of upper and lower one pair rolls have the same diameter over a full length in their length direction, and upper and lower one pair rolls were disposed so that their axial cores were parallel.

And, the foamed sheet with closed cells was supplied between facing surfaces of the upper and lower rolls, the foamed sheet with closed cells was compressed in its thickness direction to apply a compression stress and, at the same time, a shear stress was added in a planar direction, to break cell walls of a part of closed cells of a cell layer of the foamed sheet with closed cells to communicate them into open cells, thereby, a polyolefin-based resin crosslinked foamed sheet was obtained. The cell layer of the polyolefin-based resin crosslinked foamed sheet consisted of closed cells and open cells in which a part of the closed cells were converted into open cells, and skin layers were formed on both sides of the cell layer. An apparent density of the resulting polyolefin-based resin crosslinked foamed sheet is shown in Table 1.

COMPARATIVE EXAMPLE 1

The foamed sheet with closed cells manufactured in Example 2 was used as it was without supplying it between upper and lower one pair rolls.

Comparative Example 2

A foamable resin composition consisting of 100 parts by weight of an ethylene-vinyl acetate copolymer (melt flow rate: 1.3 g/10 min, density: 0.930 g/cm$^3$, vinyl acetate content: 14% by weight), 12 parts by weight of azodicarbonamide, 0.5 part by weight of active zinc oxide, and 0.83 part by weight of dicumyl peroxide was kneaded with a mixing roll at 85° C.

Then, the foamable resin composition was filled into a mold cavity, and this was heated under pressure over 5 minutes to obtain a foamable crosslinked sheet of length 150 mm×width 150 mm×height 7 mm having a rectangular parallelepiped shape.

Then, the foamable crosslinked sheet was supplied to an oil bath at 170° C., this was heated over 40 minutes, a primary intermediate foamed sheet in which 30% by weight of azodicarbonamide had been degraded was taken out from the oil bath, further, the primary intermediate foamed sheet was supplied to a mold of length 390 mm×width 390 mm×21 mm having a rectangular parallelepiped shape, and this mold was supplied to an oil bath at 190° C., and heated over 20 minutes to completely degrade azodicarbonamide, to obtain a foamed sheet with closed cells having a thickness of 21 mm. In the foamed sheet with closed cells, non-foamed layers were laminated and integrated on both sides of a foamed layer consisting of closed cells. A thickness of the foamed sheet with closed cells, an apparent density of the foamed sheet with closed cells, an expansion ratio of the foamed sheet with closed cells, and an average cell diameter of closed cells of a cell layer in the foamed sheet with closed cells (simply referred to as "average cell diameter" in Table 2) are shown in Table 2.

Subsequently, columnar upper and lower rolls of upper and lower rolls one pair having the same diameter and the same rotation direction on facing surfaces were prepared. A gap between facing surfaces of upper and lower rolls is shown in Table 2. Circumferential speeds of upper and lower rolls were the same. Circumferential speeds of upper and lower rolls are shown in Table 2. Both of upper and lower one pair rolls had the same diameter over a full length in their length direction, and upper and lower one pair rolls were disposed so that their axial cores were parallel.

And, the foamed sheet with closed cells was supplied between facing surfaces of the upper and lower rolls, and the foamed sheet with closed cells was compressed in its thickness direction to apply a compression stress, to break cell walls of a part of closed cells of a cell layer of the foamed sheet with closed cells, to communicated them into open cells, thereby, a polyolefin-based resin crosslinked foamed sheet was obtained. The cell layer of the polyolefin-based resin crosslinked foamed sheet consisted of closed cells and open cells in which a part of the closed cells were converted into open cells.

Since non-foamed layers of the polyolefin-based resin crosslinked foamed sheet were hard, the polyolefin-based resin crosslinked foamed sheet could not been used as a sealing material. Then, non-foamed layers on both sides of the polyolefin-based resin crosslinked foamed sheet were removed, the foamed sheet was sliced to its thickness of 5 mm, a density of the foamed sheet and an average cell diameter of closed cells were measured, and a density was found to be 50 kg/m$^3$, and an average cell diameter was found to be 0.86 mm.

A 50% compressive strength, a 50% compression set and an open cell ratio of the resulting polyolefin-based resin crosslinked foamed sheet (foamed sheet with closed cells in Comparative Example 1) were measured according to the aforementioned procedure, 50% compressive water tightness, 75% compressive water tightness and vacuum moldability of the sheet were measured according to the following procedure, and results are shown in Tables 1 and 2.

(Compressive Water Tightness)

The polyolefin-based resin crosslinked foamed sheet was cut in its thickness direction into strips having a width of 10 mm, to prepare a belt body A. Separately, one pair of glass plates 1, 1 having a front square shape, a constant thickness, and a smooth surface were prepared, the belt body A was bent into a front U-shape between facing surfaces of this one pair of glass plates 1, 1 so that skin layers thereof became in inner and outer directions, and this was held from front and rear directions using a bolt 21 and nut 22.

The belt body A was compressed in a width direction with one pair of glass plates 1, 1 so that a width of the belt body A after held by one pair of glass plates 1, 1 became 50% of a width of the belt body A before held by them when 50% compressive water tightness was measured, and so that a width of the belt body A after held by one pair of glass plates 1, 1 became 25% of a width of the belt body A before held by them when 75% compressive water tightness was measured. In addition, spacer members 3, 3 intervened between facing surfaces of one pair of glass plates 1, 1 above and below the belt body A, so that the belt body A had totally the same compression degree.

And, water W was supplied to a space surrounded by the U-shaped belt body A and one pair of glass plates 1, 1 so that a greatest depth h became 100 mm, whether water leakage occurred or not was observed with naked eyes, and, when water leakage did not occur, this was indicated by ○ and, when water leakage occurred, this was indicated by X.

In Comparative Example 2, non-foamed layers on both sides of the polyolefin-based resin crosslinked foamed sheet were removed, and the sheet was sliced so that a thickness of the foamed sheet became 5 mm, and a width of the foamed sheet became 10 mm, to obtain a belt body, which was used.

(Vacuum Moldability)

A cylindrical female mold having a bottom was prepared, in which a cylindrical circumferential wall part having a height of 50 mm is provided vertically upward from an outer circumferential edge of a planar circle-shaped bottom part having a diameter of 100 mm. And, the polyolefin-based resin crosslinked foamed sheet was heated to 120° C., and this was vacuum molded using the female mold to obtain a molded article having a cup shape. The polyolefin-based resin crosslinked foamed shape of Example 5 was heated to 130° C., and he polyolefin-based resin crosslinked foamed sheet of Example 6 was heated to 140° C. In Comparative Example 2, non-foamed layers on both sides of the polyolefin-based resin crosslinked foamed sheet were removed, and the foamed sheet was sliced to its thickness of 5 mm to obtain a sheet for molding, which was used.

In Examples 1 to 6 and Comparative Example 1, molded articles having a cup shape as that of a female mold could be obtained (expressed by "○" in Tables 1 and 2). On the other hand, in a sheet for molding of Comparative Example 2, the air was escaped in a thickness direction of the sheet for molding, sheet could not be vacuum molded (expressed by "X" in Table 2).

TABLE 1

| | | Example 1 | Example 2 | Example 3 | Example 4 | Example 5 | Example 6 |
|---|---|---|---|---|---|---|---|
| Formulation (part by weight) | Low density polyethylene | 100 | 100 | 100 | — | — | — |
| | Ethylene-vinyl acetate copolymer | — | — | — | 100 | — | — |
| | Linear low density polyethylene | — | — | — | — | 100 | 30 |
| | Ethylene-propylene random copolymer | — | — | — | — | — | 70 |
| | Azodicarbonamide | 5 | 10 | 15 | 10 | 10 | 10 |
| | Zinc stearate | 2 | 2 | 2 | 2 | — | — |
| | Calcium stearate | — | — | — | — | 1 | — |
| | Active zinc oxide | — | — | — | — | — | — |
| | Phenol-based antioxidant | 0.2 | 0.2 | 0.2 | 0.2 | 0.2 | 1 |

TABLE 1-continued

|  |  | Example 1 | Example 2 | Example 3 | Example 4 | Example 5 | Example 6 |
|---|---|---|---|---|---|---|---|
|  | Trimethylolpropane trimethacrylate | — | — | — | — | — | 3 |
|  | Dicumyl peroxide | — | — | — | — | — | — |
| Thickness of foamable resin sheet (mm) |  | 3.10 | 2.45 | 2.15 | 2.45 | 2.45 | 2.45 |
| Electron beam irradiation dose (Mrad) |  | 3.1 | 2.9 | 2.8 | 1.9 | 2.5 | 2.2 |
| Heating temperature (° C.) |  | 240 | 240 | 240 | 240 | 260 | 260 |
| Pretreatment foamed sheet | Thickness (mm) | 5.1 | 5.2 | 5.1 | 5.0 | 5.1 | 5.1 |
|  | Apparent density (kg/m³) | 103 | 51 | 33 | 50 | 50 | 49 |
|  | Expansion ratio (times) | 9.7 | 19.6 | 30.3 | 20.0 | 20.0 | 20.4 |
|  | Average cell diameter (mm) | 0.32 | 0.34 | 0.42 | 0.35 | 0.30 | 0.30 |
|  | Width (m) | 0.97 | 1.25 | 1.45 | 1.25 | 1.25 | 1.30 |
| Roll gap (mm) |  | 0.2 | 0.2 | 0.2 | 0.2 | 0.2 | 0.2 |
| Roll circumferential speed difference (%) |  | 25 | 20 | 15 | 15 | 20 | 25 |
| Circumferential speed of upper roll (m/min) |  | 6.25 | 6 | 5.75 | 5.75 | 6 | 6.25 |
| Circumferential speed of lower roll (m/min) |  | 5 | 5 | 5 | 5 | 5 | 5 |
| Polyolefin-based resin crosslinked foamed sheet | Apparent density (kg/m³) | 101 | 53 | 49 | 48 | 51 | 52 |
|  | 50% Compressive strength (kPa) | 21 | 14 | 8 | 11 | 15 | 46 |
|  | 50% Compression set (%) | 2.5 | 1.9 | 2.8 | 3.3 | 1.6 | 1.5 |
|  | Open cell ratio (%) | 93 | 97 | 95 | 95 | 96 | 68 |
|  | 50% Compressive water tightness | ◯ | ◯ | ◯ | ◯ | ◯ | ◯ |
|  | 75% Compressive water tightness | ◯ | ◯ | ◯ | ◯ | ◯ | ◯ |
|  | Vacuum moldability | ◯ | ◯ | ◯ | ◯ | ◯ | ◯ |

TABLE 2

|  |  | Comparative Example 1 | Comparative Example 2 |
|---|---|---|---|
| Formulation (part by weight) | Low density polyethylene | 100 | — |
|  | Ethylene-vinyl acetate copolymer | — | 100 |
|  | Linear low density polyethylene | — | — |
|  | Ethylene-propylene random copolymer | — | — |
|  | Azodicarbonamide | 10 | 12 |
|  | Zinc stearate | 2 | — |
|  | Calcium stearate | — | — |
|  | Active zinc oxide | — | 0.5 |
|  | Phenol-based antioxidant | 0.2 | — |
|  | Trimethylolpropane trimethacrylate | — | — |
|  | Dicumyl peroxide | — | 0.83 |
| Thickness of foamable resin sheet (mm) |  | 2.45 | — |
| Electron beam irradiation dose (Mrad) |  | 2.9 | — |
| Heating temperature (° C.) |  | 240 | — |
| Pretreatment foamed sheet | Thickness (mm) | 5.2 | 21 |
|  | Apparent density (kg m³) | 51 | 50 |
|  | Expansion ratio (times) | 19.6 | 20.0 |
|  | Average cell diameter (mm) | 0.34 | 0.86 |
|  | Width (m) | 1.25 | — |
| Roll gap (mm) |  | — | 3 |
| Roll circumferential speed difference (%) |  | — | 0 |
| Circumferential speed of upper roll (m/min) |  | — | 5.00 |
| Circumferential speed of lower roll (m/min) |  | — | 5.00 |
| Polyolefin-based resin crosslinked foamed sheet | Apparent density (kg/m³) | 51 | 48 |
|  | 50% Compressive strength (kPa) | 126 | 7 |
|  | 50% Compression set (%) | 20.1 | 1.8 |
|  | Open cell ratio (%) | 12 | 93 |
|  | 50% Compressive water tightness | — | X |
|  | 75% Compressive water tightness | — | X |
|  | Vacuum moldability | ◯ | X |

EXAMPLE 7

Figure 3:
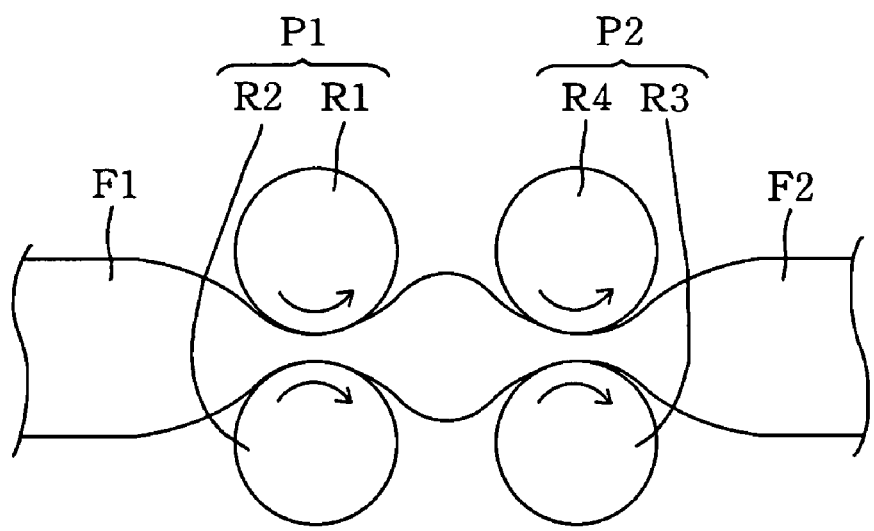
FIG. 3 is a schematic side view showing one example of a manufacturing apparatus.

As shown in FIG. 3, a manufacturing apparatus equipped with a roll group consisting of a roll pair P1 consisting of upper and lower one pair rolls R1, R2, and a roll pair P2 consisting of upper and lower one pair rolls R3, R4 disposed in front of this roll pair P1 was prepared. A gap between facing surfaces of rolls R1, R2 of a roll pair P1 was 0.15 mm, and a gap between facing surfaces of rolls R3, R4 of a roll pair P2 was 0.15 mm. Rolls R1 to R4 were columnar rolls having the same diameter. Rolls R1 to R4 had the same diameter over a full length in their length direction. A roll R1 and a roll R2 of a roll pair P1 were disposed so that their axial cores were parallel. A roll R3 and a roll R4 of a roll pair P2 were disposed so that their axial cores were parallel.

A circumferential speed V3 of a roll R1 was 5 m/min, a circumferential speed V2 of a roll R4 was 6.75 m/min, and a circumferential speed difference between a circumferential speed V1 of a roll R1 and a circumferential speed V2 of a roll R2 in a roll pair P1 was 35%.

In addition, a circumferential speed V1 of a roll R3 was 5.8 m/min, a circumferential speed V4 of a roll R2 was 7.8 m/min, and a circumferential speed difference between a circumferential speed V3 of a roll R3 and a circumferential speed V4 of a roll R4 in a roll pair P2 was 34.5%.

On the other hand, a foamed sheet F1 with closed cells, produced by horizontal foaming, consisting of a polyolefin-based resin containing linear low density polyethylene as a base, was prepared. This foamed sheet F1 with closed cells was constructed of a foamed layer consisting substantially only of closed cells, and skin layers formed on both sides of this foamed layer and formed by air-tight adhesion of cell walls of cells of this foamed layer and integration thereof into a thin film. And, the foamed layer and skin layers of the polyolefin-based resin foamed sheet F1 had a crosslinked structure obtained by electron beam crosslinking. An expansion ratio of the foamed sheet F1 with closed cells was 40 times (density: 25 kg/m$^3$), a thickness of the foamed sheet F1 with closed cells was 10.2 mm, a width of the foamed sheet F1 with closed cells was 2 m, and an average cell diameter of closed cells of a cell layer in the foamed sheet F1 with closed cells was 0.30 mm.

Then, the foamed sheet F1 with closed cells was supplied between a roll R1 and a roll R2 of a roll pair P1, and a compression stress was applied to the foamed sheet F1 with closed cells in its thickness direction and, at the same time, a shear stress was applied thereto in a planar direction to rupture a part of closed cells of a cell layer of the foamed sheet F1 with closed cells, to break cell walls, and communicate closed cells with each other into open cells.

Subsequently, the foamed sheet F1 with closed cells discharged from a gap between the roll R1 and the roll R2 of the roll pair P1 is sequentially supplied between a roll R3 and a roll R4 of a roll pair P2 and a compression stress was applied to the foamed sheet F1 with closed cells in its thickness direction and, at the same time, a shear stress was applied thereto in a planar direction to rupture a part of closed cells of a cell layer of the foamed sheet F1 with closed cells, to break cell walls, and communicate closed cells with each other into open cells, thereby a polyolefin-based resin crosslinked foamed sheet F2 was obtained. A cell layer of the polyolefin-based resin crosslinked foamed sheet F2 consisted of closed cells and open cells in which a part of the closed cells were communicated with each other, and skin layers were laminated and integrated on both sides of the cell layer. An expansion ratio, an apparent density and a thickness of the resulting polyolefin-based resin crosslinked foamed sheet are shown in Table 3.

The resulting polyolefin-based resin crosslinked foamed sheet F2 was cut in its thickness direction at an arbitrary place, this cut surface was observed using a scanning electron microscope, cell walls of closed cells of the cell layer were broken at a high ratio, and open cells were uniformly formed in the cell layer over a full length in its thickness direction.

EXAMPLE 8

A foamed sheet F1 with closed cells, produced by vertical foaming, consisting of a polyolefin-based resin containing ethylene-vinyl acetate copolymer as a base, was prepared. This foamed sheet F1 with closed cells was constructed of a foamed layer consisting substantially only of closed cells, and skin layers formed on both sides of this foamed layer and formed by air-tight adhesion of cell walls of cells of this foamed layer and integration thereof into a thin film. And, the foamed layer and skin layers of the foamed sheet F1 with closed cells had a crosslinked structure obtained by electron beam crosslinking. An expansion ratio of the foamed sheet F1 with closed cells was 30 times (density: 31 kg/m$^3$), a thickness of the foamed sheet F1 with closed cells was 5.2 mm, a width of the foamed sheet F1 with closed cells was 2 m, and an average cell diameter of closed cells of the foamed layer in the foamed sheet F1 with closed cells was 0.25 mm.

According to the same manner as that of Example 7 except that this polyolefin-based resin crosslinked foamed sheet F1 was used, circumferential speeds V1 to V4 of rolls R1 to R4 of roll pairs P1, P2, a gap between facing surfaces of rolls R1, R2 of a roll pair P1, and a gap between facing surfaces of rolls R3, R4 of a roll pair P2 were adjusted as shown in Table 3, closed cells of the cell layer were ruptured to break cell walls, to communicate closed cells with each other, thereby, a polyolefin-based resin crosslinked foamed sheet F2 was obtained. An expansion ratio, an apparent density and a thickness of the resulting polyolefin-based resin crosslinked foamed sheet are shown in Table 3.

The resulting polyolefin-based resin crosslinked foamed sheet F2 was cut in its thickness direction at an arbitrary place, this cut surface was observed using a scanning electron microscope, cell walls of closed cells of the cell layer were broken at a high ratio, and open cells were uniformly formed in the cell layer over a full length in its thickness direction.

EXAMPLE 9

A foamed sheet F1 with closed cells, produced by horizontal foaming, consisting of a polyolefin-based resin containing ethylene-vinyl acetate copolymer as a base, was prepared. This foamed sheet F1 with closed cells was constructed of a foamed layer consisting substantially only of closed cells, and skin layers formed on both sides of this foamed layer and formed by air-tight adhesion of cell walls of cells of this foamed layer and integration thereof into a thin film. And, the foamed layer and skin layers of the foamed sheet F1 with closed cells had a crosslinked structure obtained by electron beam crosslinking. An expansion ratio of the foamed sheet F1 with closed cells was 25 times (density: 40 kg/m$^3$), a thickness of the foamed sheet F1 with closed cells was 7.5 mm, a width of the foamed sheet F1 with closed cells was 2 m, and an average cell diameter of closed cells of the cell layer in the foamed sheet F1 with closed cells was 0.35 mm.

According to the same manner as that of Example 7 except that this polyolefin-based resin crosslinked foamed sheet F1 was used, and circumferential speeds V1 to V4 of rolls R1 to R4 of roll pairs P1, P2, a gap between facing surfaces of rolls R1, R2 of a roll pair P1, and a gap between facing surfaces of rolls R3, R4 of a roll pair P2 were adjusted as shown in Table 3, closed cells of the cell layer were ruptured to break cell walls, to communicate closed cells with each other into open cells, thereby, a polyolefin-based resin crosslinked foamed shape F2 was obtained. An expansion ratio, an apparent density and a thickness of the resulting polyolefin-based resin crosslinked foamed sheet are shown in Table 3.

The resulting polyolefin-based resin crosslinked foamed sheet F2 was cut in its thickness direction at an arbitrary place, this cut surface was observed using a scanning electron microscope, cell walls of closed cells of the cell layer were broken at a high ratio, and open cells were uniformly formed in the cell layer over a full length in its thickness direction.

EXAMPLE 10

A foamed sheet F1 with closed cells, produced by vertical foaming, consisting of a polyolefin-based resin containing linear low density polyethylene as a base, was prepared. This foamed sheet F1 with closed cells was constructed of a foamed layer consisting substantially only of closed cells, and skin layers formed on both sides of this foamed layer and formed by air-tight adhesion of cell walls of cells of this foamed layer and integration thereof into a thin film. And, the foamed layer and skin layers of the foamed sheet F1 with closed cells had a crosslinked structure obtained by electron beam crosslinking. An expansion ratio of the foamed sheet F1 with closed cells was 21 times (density: 47 kg/m$^3$), a thickness of the foamed sheet F1 with closed cells was 3.3 mm, a width of the foamed sheet F1 with closed cells was 2 m, and an average cell diameter of closed cells of the cell layer in the foamed sheet F1 with closed cells was 0.23 mm.

According to the same manner as that of Example 7 except that this foamed sheet F1 with closed cells was used, and circumferential speeds V1 to V4 of rolls R1 to R4 of rolls P1, P2, a gap between facing surfaces of rolls R1, R2 of a roll pair P1, and a gap between facing surfaces of rolls R3, R4 of a roll pair P2 were adjusted as shown in Table 3, closed cells of the cell layer were ruptured to break cell walls, and communicate closed cells with each other into open cells, thereby, a polyolefin-based resin crosslinked foamed sheet F2 was obtained. An expansion ratio, an apparent density and a thickness of the resulting polyolefin-based resin crosslinked foamed sheet are shown in Table 3.

The resulting polyolefin-based resin crosslinked foamed sheet F2 was cut in its thickness direction at an arbitrary place, this cut surface was observed using a scanning electron microscope, cell walls of closed cells of the cell layer were broken at a high ratio, and open cells were uniformly formed in the cell layer over a full length in its thickness direction.

EXAMPLE 11

A foamed sheet F1 with closed cells, produced by vertical foaming, consisting of a polyolefin-based resin containing linear low density polyethylene as a base, was prepared. This foamed sheet F1 with closed cells was constructed of a foamed layer consisting substantially only of closed cells, and skin layers formed on both sides of this foamed layer and formed by air-tight adhesion of cell walls of cells of this foamed layer and integration thereof into a thin film. And, the foamed layer and skin layers of the foamed sheet F1 with closed cells had a crosslinked structure obtained by electron beam crosslinking. An expansion ratio of the foamed sheet F1 with closed cells was 7.4 times (density: 135 kg/m$^3$), a thickness of the foamed sheet F1 with closed cells was 3.0 mm, a width of the foamed sheet F1 with closed cells was 2 m, and an average cell diameter of closed cells of the cell layer in the foamed sheet F1 with closed cells was 0.18 mm.

According to the same manner as that of Example 7 except that this foamed sheet F1 with closed cells was used, and circumferential speeds V1 to V4 of rolls R1 to R4 of roll pairs P1, P2, a gap between facing surfaces of rolls R1, R2 of a roll pair P1, and a gap between facing surfaces of rolls R3, R4 of a roll pair P2 were adjusted as shown in Table 3, closed cells of the cell layer were ruptured to break cell walls, and communicate closed cells with each other into open cells, thereby, a polyolefin-based resin crosslinked foamed sheet F2 was obtained. An expansion ratio, an apparent density and a thickness of the resulting polyolefin-based resin crosslinked foamed sheet are shown in Table 3.

The resulting polyolefin-based resin crosslinked foamed sheet F2 was cut in its thickness direction at an arbitrary place, and this cut surface was observed using a scanning electron microscope, cell walls of closed cells of the cell layer were broken at a high ratio, and open cells were uniformly formed in the cell layer over a full length in its thickness direction.

A 10% compressive strength, a 25% compressive strength and a 50% compressive strength of the resulting polyolefin-based resin crosslinked foamed sheet F2 (expressed by "after treatment" in Table 3) were measured according to JIS K 6767. A 50% compression set of the polyolefin-based resin crosslinked foamed sheet F2 was measured. An open cell ratio of the polyolefin-based resin crosslinked foamed sheet F2 was measured. In addition, a 10% compressive strength, a 25% compressive strength and a 50% compressive strength of the foamed sheet F1 with closed cells before application of a compression force and a shear stress (expressed by "untreated" in Table 3) were measured according to JIS K 6767. A 50% compression set of the foamed sheet F1 with closed cells was measured. An open cell ratio of the foamed sheet F1 with closed cells was measured.

TABLE 3

|  |  | Example 7 | | Example 8 | | Example 9 | | Example 10 | | Example 11 | |
|---|---|---|---|---|---|---|---|---|---|---|---|
|  |  | Un-treated | After treatment | Un-treated | After treatment | Un-treated | After treatment | Un-treated | After treatment | Un-treated | After treatment |
| Foamed sheet | Expansion ratio (times) | 40 | 41 | 30 | 27 | 25 | 23 | 21 | 25 | 7.4 | 8.3 |
|  | Apparent density (kg/m$^3$) | 25 | 25 | 31 | 37 | 40 | 45 | 47 | 40 | 135 | 118 |
|  | Thickness (mm) | 10.2 | 10.8 | 5.2 | 5.3 | 7.5 | 7.1 | 3.3 | 3.6 | 3.0 | 3.0 |
|  | 10% Compressive strength (kpa) | 25 | 4 | 16 | 2 | 21 | 4 | 36 | 6 | 213 | 42 |
|  | 25% Compressive strength (kpa) | 46 | 6 | 39 | 11 | 44 | 9 | 58 | 11 | 262 | 89 |
|  | 50% Compressive strength (kpa) | 112 | 12 | 109 | 27 | 115 | 22 | 134 | 24 | 418 | 195 |
|  | 50% Compression set (%) | 22.5 | 2.7 | 21.8 | 2.2 | 23.1 | 2.0 | 18.8 | 1.9 | 16.5 | 6.3 |
|  | Open cell ratio (%) | 15 | 94 | 11 | 88 | 8 | 91 | 7 | 93 | 4 | 63 |
| Treatment condition | Roll pair P1 Gap (mm) | — | 0.15 | — | 0.15 | — | 0.15 | — | 0.15 | — | 0.18 |
|  | Circumferential speed V1 of roll R1 (m/min) | — | 5 | — | 5 | — | 5 | — | 5 | — | 5 |
|  | Circumferential speed V2 of roll R2 (m/min) | — | 6.75 | — | 6 | — | 6 | — | 6.5 | — | 6.5 |
|  | Circumferential speed difference (%) | — | 35 | — | 20 | — | 20 | — | 30 | — | 30 |
|  | Roll pair P2 Gap (mm) | — | 0.15 | — | 0.15 | — | 0.15 | — | 0.15 | — | 0.18 |
|  | Circumferential speed V3 of roll R3 (m/min) | — | 5.8 | — | 5.4 | — | 5.4 | — | 5.7 | — | 5.7 |
|  | Circumferential speed V4 of roll R4 (m/min) | — | 7.8 | — | 6.5 | — | 6.5 | — | 7.4 | — | 7.4 |
|  | Circumferential speed difference (%) | — | 34.5 | — | 20.4 | — | 20.4 | — | 29.8 | — | 29.8 |

INDUSTRIAL APPLICABILITY

The polyolefin-based resin crosslinked foamed sheet of the present invention, and the polyolefin-based resin crosslinked foamed sheet obtained by the method for producing a polyolefin-based resin crosslinked foamed sheet of the present invention are excellent in heat resistance and flexibility, and have a small cell diameter, and can be used in sealing materials of a wall material for buildings, gaskets of an automobile lamp cover, cushioning materials of a door material for automobiles, comfort materials, buffering materials, and interior materials in automobiles excellent in touching.

The invention claimed is:

1. A method for producing a polyolefin-based resin crosslinked foamed sheet, comprising the steps of using, as one set of a roll pair, one pair of rolls which have different circumferential speeds, and are rotated so that rotating directions on facing surfaces are the same direction, supplying sequentially a foamed sheet with closed cells, comprising a polyolefin-based resin, to a gap between rolls of each roll of a roll group in which two or more sets of the roll pairs are sequentially disposed, and applying a compression force and a shear stress to the foamed sheet with closed cells simultaneously to rupture a part of closed cells of the foamed sheet with closed cells to communicate closed cells into open cells, wherein rolls having a greater circumferential speed of respective roll pairs are disposed on opposite sides, putting the foamed sheet with closed cells therebetween, in arbitrary two sets of roll pairs adjacent to each other among the roll group, wherein two sets of roll pairs adjacent to each other among a roll group, a circumferential speed $V1$ of a roll $R1$ having a smaller circumferential speed and a circumferential speed $V2$ of a roll $R2$ having a greater circumferential speed among a roll pair on a rear side, and a circumferential speed $V3$ of a roll $R3$ having a smaller circumferential speed and a circumferential speed $V4$ of a roll $4$ having a greater circumferential speed among a roll pair on a front side satisfy the following conditions, a roll $R1$ and a roll $R4$ are disposed on the same side of the foamed sheet with closed cells and, at the same time, a roll $R2$ and a roll $R3$ are disposed on the same side of the foamed sheet with closed cells, and circumferential speed $V2$ > circumferential speed $V1$, circumferential speed $V4$ > circumferential speed $V3$, circumferential speed $V3$ > circumferential speed $V1$.

2. The method for producing a polyolefin-based resin crosslinked foamed sheet according to claim 1, wherein the number of roll pairs is two sets.

3. The method for producing a polyolefin-based resin crosslinked foamed sheet according to claim 1, wherein a circumferential speed difference between rolls in a roll pair is 2 to 400%.

4. The method for producing a polyolefin-based resin crosslinked foamed sheet according to claim 1, wherein the gap between the rolls of the roll pair is 0.01 to 50mm.

5. The method for producing a polyolefin-based resin crosslinked foamed sheet according to claim 1, wherein a width of the foamed sheet with closed cells is 1 m or more.

6. The method for producing a polyolefin-based resin crosslinked foamed sheet according to claim 1, wherein an apparent density of the foamed sheet with closed cells is 20 to 500 $kg/m^3$.

7. The method for producing a polyolefin-based resin crosslinked foamed sheet according to claim 1, wherein the foamed sheet with closed cells comprises a cell layer having a crosslinked structure obtained by electron beam crosslinking, and including substantially closed cells having an average cell diameter of 0.1 to 1 mm, and skin layers or a skin layer formed on both sides or one side of this cell layer, formed by air-tight adhesion of cell walls of cells of the cell layer and integration thereof into a thin film, and having a crosslinked structure obtained by electron beam crosslinking.

8. The method for producing a polyolefin-based resin crosslinked foamed sheet according to claim 1, wherein before the foamed sheet with closed cells is supplied to the gap between the rolls of the roll pair, a tensile force is applied to the foamed sheet with closed cells in a direction of supplying this foamed sheet with closed cells to a roll group.

* * * * *